(12) United States Patent
Fischer et al.

(10) Patent No.: US 7,952,305 B2
(45) Date of Patent: May 31, 2011

(54) REVERSE DRIVE CONTROL FOR A MOTORCYCLE

(75) Inventors: Mark W. Fischer, Racine, WI (US);
Richard Parisey, Hartford, WI (US);
Jay M. Klubertanz, Hartford, WI (US);
Steven P. Pertzsch, Oconomowoc, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 385 days.

(21) Appl. No.: 12/174,027

(22) Filed: Jul. 16, 2008

(65) Prior Publication Data
US 2010/0013420 A1    Jan. 21, 2010

(51) Int. Cl.
*H02P 5/00* (2006.01)
(52) U.S. Cl. ........ 318/139; 318/471; 318/434; 318/452; 318/473; 318/484
(58) Field of Classification Search .................. 318/139, 318/471, 434, 452, 473, 484; 361/23, 25, 361/28
See application file for complete search history.

(56) References Cited

U.S. PATENT DOCUMENTS

| | | | |
|---|---|---|---|
| 1,469,984 A | 10/1923 | Barlough | |
| 4,523,491 A | 6/1985 | Dittmann, Jr. | |
| 4,580,652 A | 4/1986 | Turner et al. | |
| 4,583,613 A | 4/1986 | Nakayama | |
| 4,635,506 A | 1/1987 | Imaizumi et al. | |
| 4,658,661 A | 4/1987 | Terashita | |
| 4,754,662 A | 7/1988 | Misawa | |
| 4,763,538 A | 8/1988 | Fujita et al. | |
| 4,827,148 A | 5/1989 | Hirosawa et al. | |
| 4,869,332 A | 9/1989 | Fujita et al. | |
| 4,870,874 A | 10/1989 | Ito | |
| 4,923,028 A | 5/1990 | Yamashita et al. | |
| 4,974,695 A * | 12/1990 | Politte | 180/221 |
| 5,024,113 A | 6/1991 | Ito et al. | |
| 5,069,304 A | 12/1991 | Mann | |
| 5,529,546 A * | 6/1996 | Ishino et al. | 475/76 |
| 6,024,198 A | 2/2000 | Hamby et al. | |
| 6,054,826 A * | 4/2000 | Murakami et al. | 318/471 |
| 6,076,416 A | 6/2000 | Sputhe | |
| 6,267,192 B1 | 7/2001 | Maier et al. | |
| 6,457,374 B1 | 10/2002 | Shen | |
| 6,457,381 B1 | 10/2002 | Nonaka et al. | |
| 6,708,579 B2 | 3/2004 | Punko | |
| 7,017,697 B2 | 3/2006 | Yang | |
| 7,156,197 B2 * | 1/2007 | Sanchez et al. | 180/219 |
| 7,311,636 B1 | 12/2007 | Regula | |
| 2003/0221890 A1 | 12/2003 | Fecteau et al. | |
| 2006/0032688 A1 | 2/2006 | Sanchez et al. | |
| 2007/0022833 A1 | 2/2007 | Mamba | |

* cited by examiner

*Primary Examiner* — Walter Benson
*Assistant Examiner* — David S Luo
(74) *Attorney, Agent, or Firm* — Michael Best & Friedrich LLP

(57) ABSTRACT

A vehicle comprising a rotatable wheel (e.g., three rotatable wheels), a forward drive mechanism including a forward drive motor (e.g., an internal combustion engine), and a reverse drive mechanism. The reverse drive mechanism includes a reverse drive motor (e.g., an electric motor) adapted to move the chassis in the rearward direction, and a reverse drive control programmed to inhibit operation of the reverse drive mechanism when the forward drive motor is off. In one embodiment, the vehicle includes a battery for operating the reverse drive motor, and the reverse drive control is programmed to inhibit operation of the motor when a characteristic of the battery (e.g., an output voltage) falls below a threshold. The vehicle can further include a temperature sensor for the reverse drive motor. In this embodiment, the reverse drive control is programmed to inhibit operation of the reverse drive motor when the temperature of the motor exceeds a threshold.

13 Claims, 6 Drawing Sheets

REVERSE DRIVE CONTROL FOR A MOTORCYCLE

BACKGROUND

The present invention relates to reverse drives for operating motor vehicles in reverse, and more particularly to controls for operating reverse drives.

Most motorcycles are relatively light-weight compared to automobiles, and are thus easier to maneuver without the assistance of the engine. As a result, motorcycles typically do not include a reverse gear for driving the vehicle in reverse. Instead, the rider is expected to manually move the motorcycle when it is desired to move the motorcycle backward.

Some motorcycles (e.g., motorcycles with side cars) are very large and heavy, and are difficult to move manually. As a result, they are provided with a reverse drive system to move the motorcycle backward. Such systems can be part of the standard power transmission, similar to automobiles, or they can be a separate power generation system, such as an electric motor.

SUMMARY

The present invention relates to various improvements to reverse drive systems for motorcycles. In one aspect, the invention is embodied in a vehicle comprising a chassis having a front defining a forward direction and a rear defining a rearward direction. The vehicle further includes a rotatable wheel (e.g., three rotatable wheels) supporting the chassis, a forward drive mechanism including a forward drive motor (e.g., an internal combustion engine) that is operable between an on condition and an off condition, and a reverse drive mechanism. The reverse drive mechanism includes a reverse drive motor adapted to move the chassis in the rearward direction, and a reverse drive control programmed to inhibit operation of the reverse drive mechanism when the forward drive motor is in the off condition.

In one embodiment, the reverse drive motor is an electric motor and the vehicle further includes a battery for operating the electric motor. In this embodiment, the reverse drive control can be programmed to inhibit operation of the reverse drive motor when a characteristic of the battery (e.g., an output voltage) falls below a threshold.

The vehicle can further include a temperature sensor that senses a temperature of the reverse drive motor. In this embodiment, the reverse drive control can be programmed to inhibit operation of the reverse drive motor when the temperature of the reverse drive motor exceeds a threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
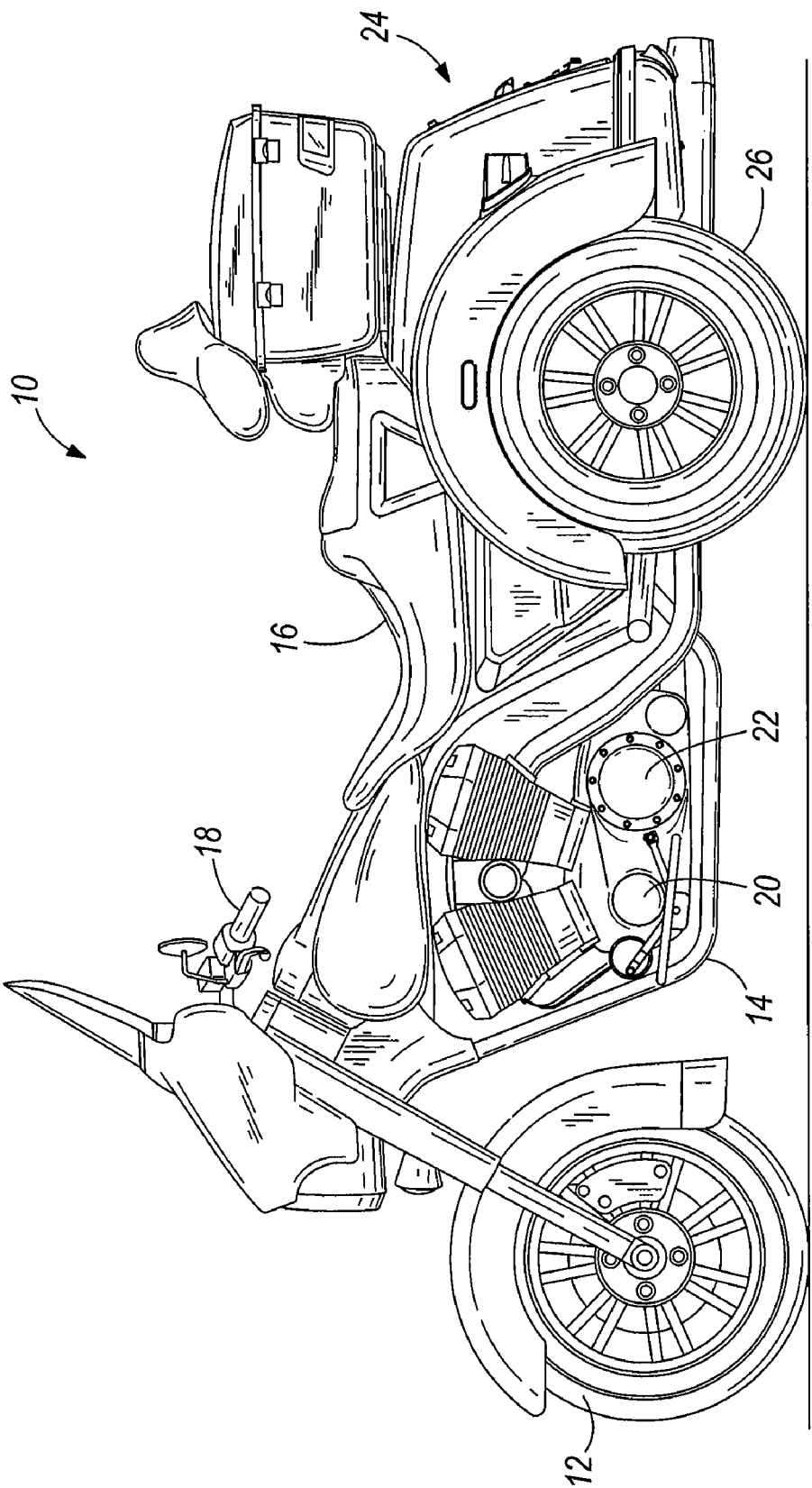
FIG. 1 is a perspective view of a motorcycle including a reverse drive control system embodying aspects of the present invention.
Figure 2:
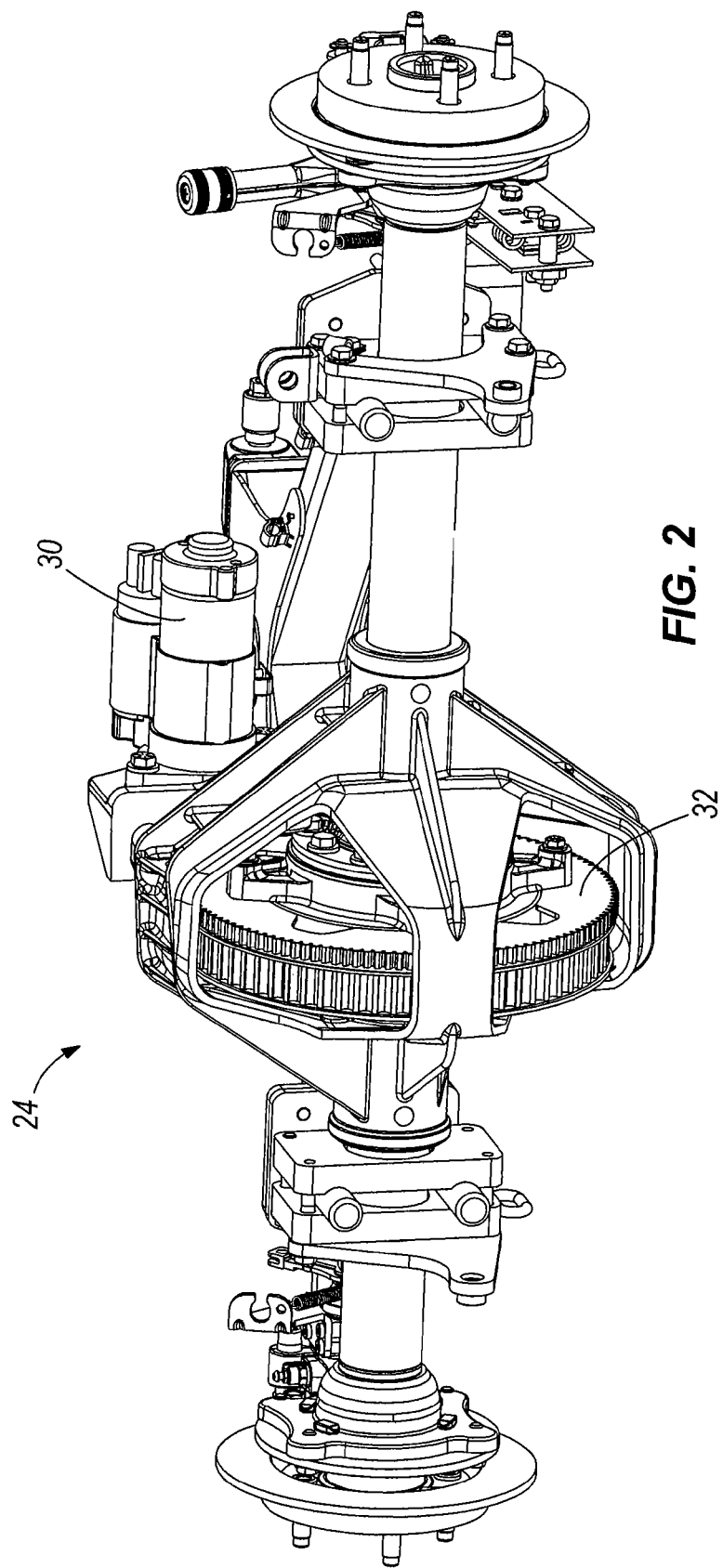
FIG. 2 is a rear perspective view of a rear axle and swing-arm assembly from the motorcycle of FIG. 1.
Figure 3:
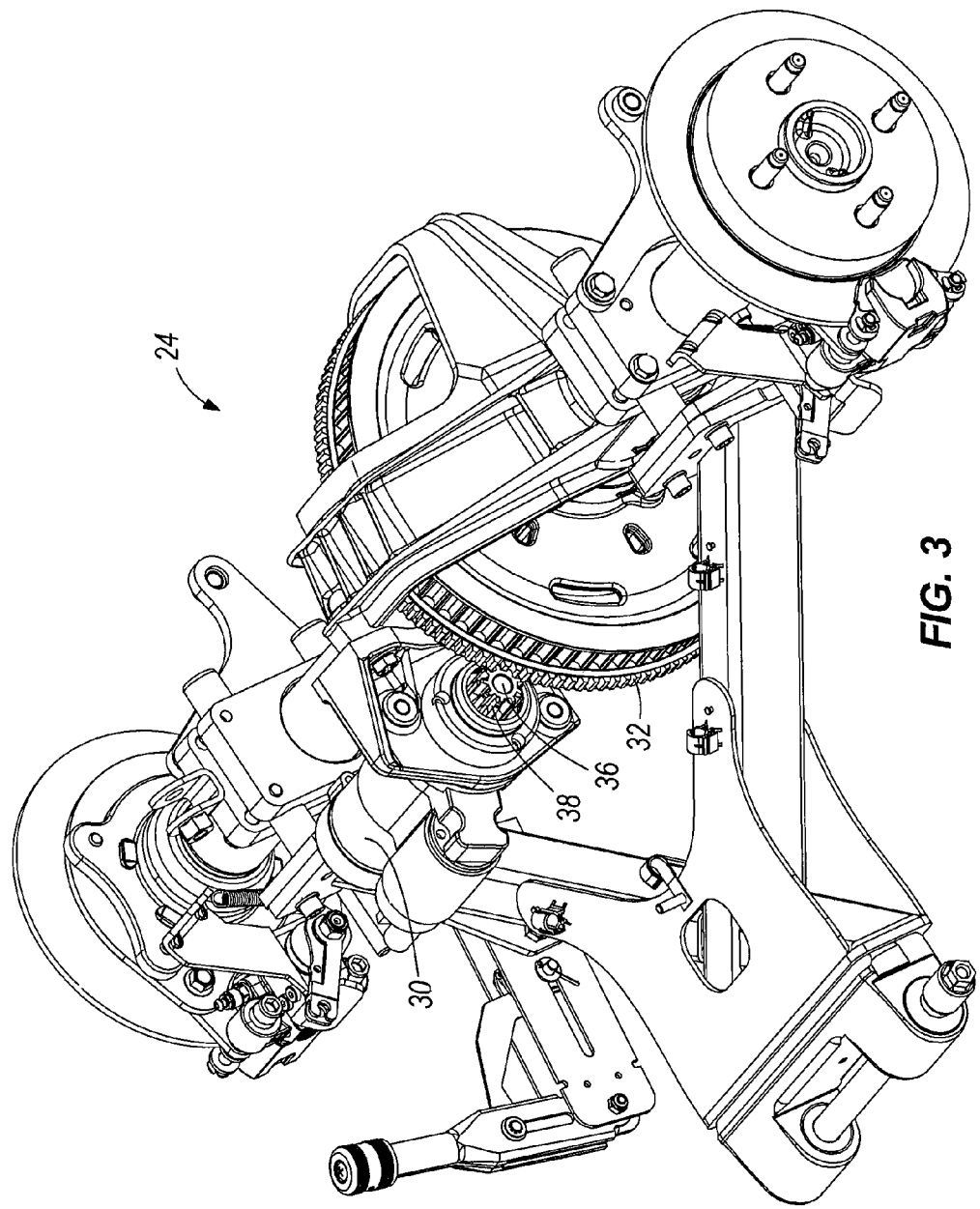
FIG. 3 is a front perspective view of the rear axle and swingarm assembly of FIG. 2.

FIGS. 1-3 illustrate a three-wheeled motorcycle 10 having a front wheel 12, a front chassis 14, a seat 16, handlebars 18, a forward drive mechanism in the form of an engine 20 and a transmission 22, and a rear axle assembly 24 supporting two rear wheels 26. As used herein, the phrase "motorcycle" refers to two-wheeled and three-wheeled motorized vehicles.

The illustrated motorcycle 10 is powered in the forward direction by the engine 20 providing power through the transmission 22 and to at least one of the rear wheels 26. The transmission 22 can be shifted between various gears to achieve a wide range of vehicle speeds.

Like any internal combustion engine, the illustrated engine 20 can be turned on and off. In the on condition, the engine 20 is operating (e.g. explosions in cylinders cause pistons to reciprocate within cylinders to rotate a driveshaft), and in the off position, the engine 20 is not operating (e.g. no power is provided by the engine).

Because of the size of the vehicle, it would be difficult to manually move the vehicle in the reverse direction. Accordingly, the illustrated motorcycle 10 is provided with a reverse drive mechanism that powers the motorcycle 10 in the reverse direction. As shown in FIGS. 2 and 3, the reverse drive mechanism includes a reverse drive motor in the form of an electric motor 30, a reverse drive gear 32, and a reverse drive control 34 that controls the operation of the motor 30. It is noted that the reverse drive motor is separate and distinct from the forward drive mechanism. That is, separate and distinct powered mechanisms (i.e., the electric motor 30 and the engine 20) are used for these two purposes.

As shown in FIGS. 2 and 3, the electric motor 30 is mounted to the rear axle assembly 24. The electric motor 30 includes an axially-movable shaft 36 and a pinion 38 mounted on the end of the shaft 36. The shaft 36 is coupled to an internal solenoid (not shown) that can move the shaft 36 between a retracted disengaged position and an extended engaged position. In the retracted position, the pinion 38 is disengaged from the reverse drive gear, and in the extended position the pinion 38 is engaged with the reverse drive gear 32. When power is provided to the electric motor 30, the solenoid is activated to move the pinion 38 from the retracted position to the extended position into engagement with the reverse drive gear 32, and the pinion 38 is rotated to impart rotating motion to the gear 32. The rotation is in a direction that results in rearward rotation of the rear wheels 26 of the motorcycle 10 to thereby move the motorcycle 10 backward. It should be understood that the focus of the present invention is on the mechanism for controlling the reverse drive motor 30, and therefore the present invention is applicable to reverse drive systems that utilize motors other than the one illustrated in FIGS. 2 and 3.

Figure 4:
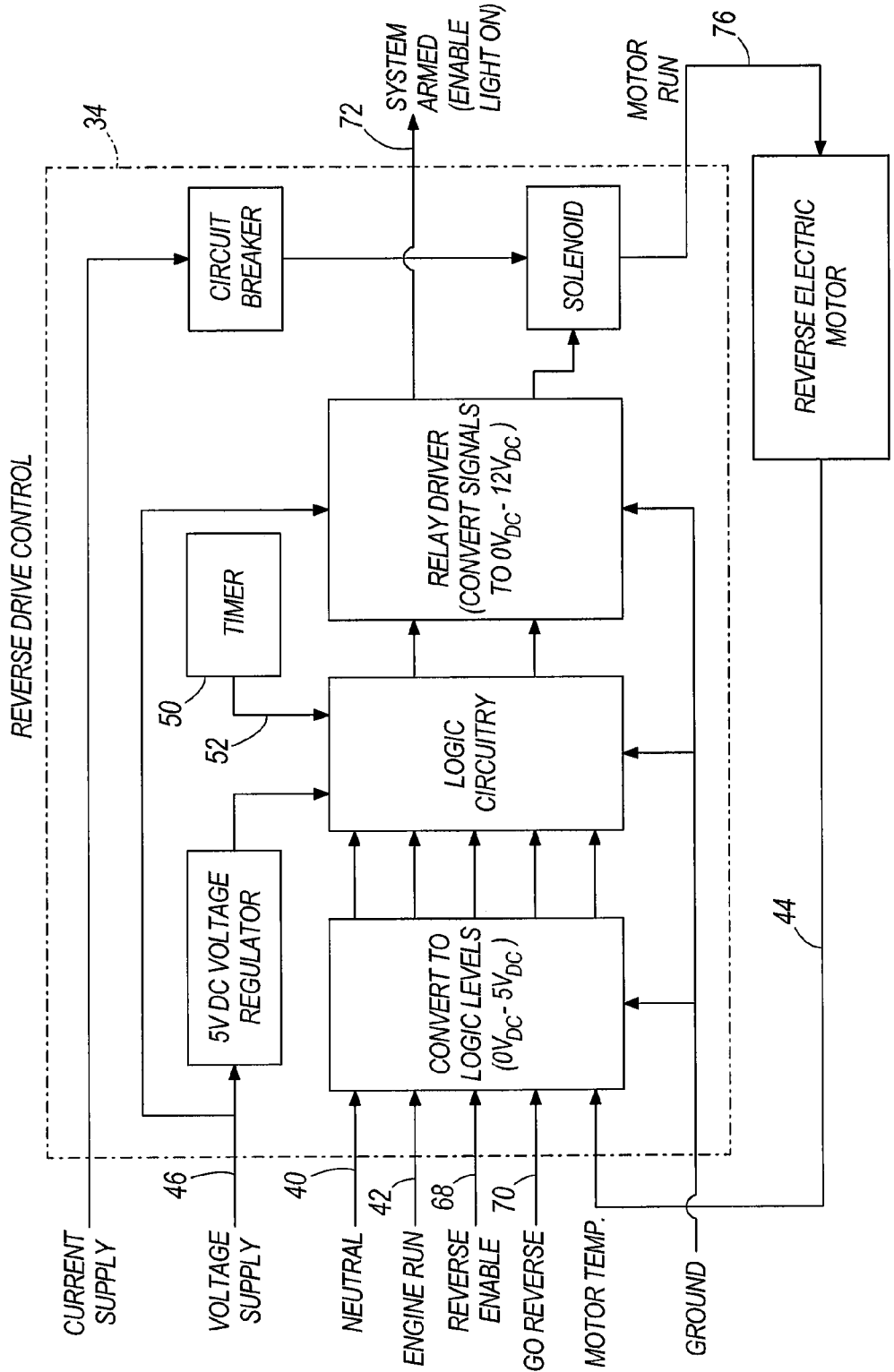
FIG. 4 is an input-output diagram for a reverse control module used with the reverse control drive system in the motorcycle of FIG. 1

Referring now to FIG. 4 the illustrated reverse drive control 34 is programmed to receive parameters and control the operation of the motor 30. More specifically, inputs to the reverse drive control 34 include a neutral signal 40, an engine run signal 42, a motor temperature signal 44, and a battery voltage signal 46.

The neutral signal 40 is provided by a neutral sensor (not shown) located in the transmission. The neutral sensor provides a signal indicating whether or not the transmission is in its neutral position.

The engine run signal 42 is provided by an engine run sensor (not shown) that detects whether the engine 20 is on or off. In the illustrated embodiment, the signal is a voltage that is taken from the fuel pump (not shown).

The motor temperature signal 44 is provided by a motor temperature sensor (not shown) positioned on, in, or adjacent to the electric motor 30. The motor temperature sensor provides a signal corresponding with the temperature of the motor 30. In the illustrated embodiment, the sensor provides an indication of when the temperature of the electric motor 30 exceeds a threshold. The motor temperature could be the temperature of the motor windings, the bearings, the housing/shell or any other appropriate location. In the illustrated embodiment, the threshold is 140 degrees C. for the motor windings.

The battery voltage signal 46 is provided by the battery (not shown). The battery voltage signal corresponds with the voltage of the battery. In the illustrated embodiment, the battery voltage signal provides an indication of when the battery voltage drops below a threshold. In the illustrated embodiment, the threshold is 9 volts.

The reverse drive control 34 also includes an internal timer 50 that provides a timer signal and limits the amount of time that the motor 30 can be operated. In the illustrated embodiment, the logic circuitry is programmed to stop the motor 30 after four seconds of operation.

Figure 5:
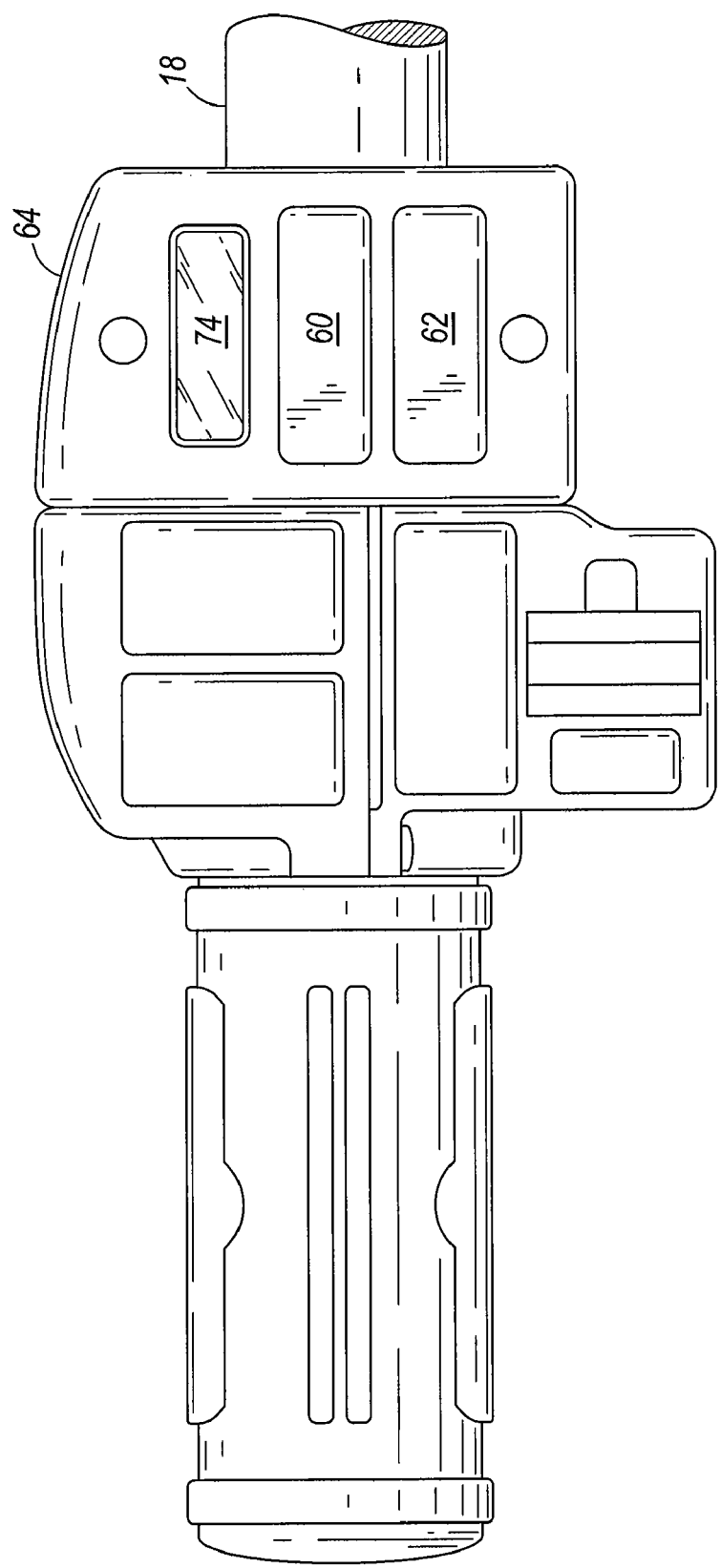
FIG. 5 is a perspective view of a switch housing that is mounted on the handlebars of the motorcycle of FIG. 1.

Two user inputs are provided to the system. As shown in FIG. 5, the two user inputs are provided by a reverse enable switch 60 and a go reverse switch 62 that are both supported by a switch housing 64 that is mounted on the handlebar 18 of the motorcycle 10. The reverse enable switch 60 is a pressure switch that can be pressed to enable the reverse drive system. When the user wants to enable the reverse drive system and have it ready to use, the user presses the reverse enable switch 60, which provides a reverse enable signal 68 to the reverse drive control 34. Upon release, the reverse enable switch 60 will return to the unpressed position due to an internal biasing member (not shown).

The go reverse switch 62 is a pressure switch that can be pressed by the user when the user wants to activate the reverse drive motor 30. Upon pressing the switch 62, a go reverse signal 70 is provided to the reverse drive control 34. Upon release, the go reverse switch 62 will return to the unpressed position due to an internal biasing member (not shown).

The above-referenced inputs are utilized by the reverse drive control 34 to provide two outputs. The first output is a reverse enable light signal 72 that illuminates a reverse enable light 74 and provides a visual indication to the operator that the reverse drive motor 30 is ready to be activated. As shown in FIG. 5, the reverse enable light 74 is supported by the switch housing 64. If the reverse drive control 34 determines that the reverse drive system is ready to be activated (as described below in detail), it will send the reverse enable light signal 72 to illuminate the reverse enable light 74.

The second output of the reverse drive control 34 is the motor activation signal 76. Under the appropriate set of conditions, the motor activation signal 76 will provide voltage to the reverse drive motor 30, resulting in rotation of the pinion 38 and rearward movement of the motorcycle 10.

Figure 6:
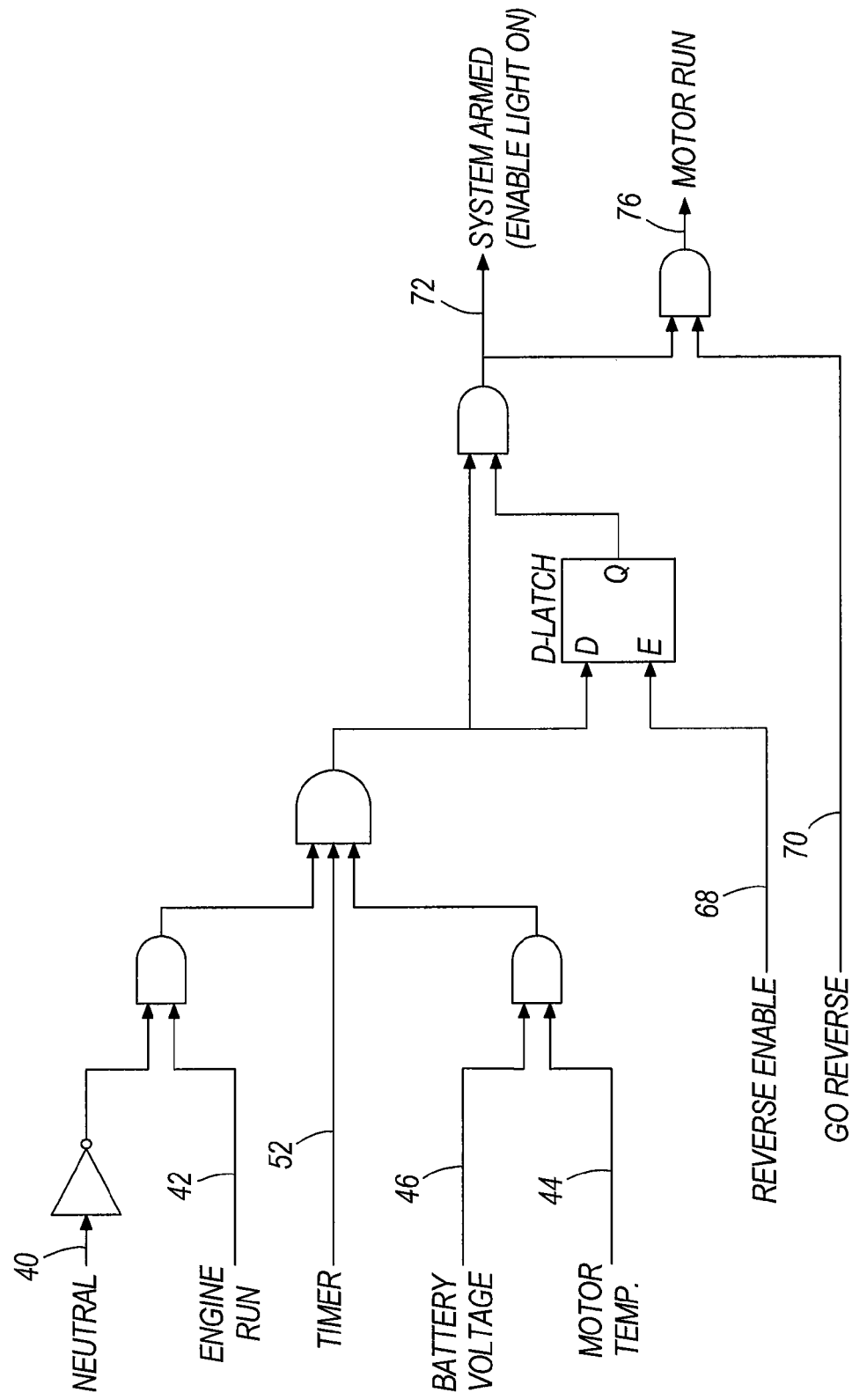
FIG. 6 is a logic diagram for the reverse control module of FIG. 3.

The logic utilized by the reverse drive control is illustrated in FIG. 6. A high-low logic arrangement is used according to the following inputs. When the vehicle is in gear, the neutral signal is high, and when the vehicle is in neutral, the neutral signal is low. When the engine is running, the engine run signal is high, and when the engine is not running the engine run signal is low. When the motor temperature is below the designated threshold, the motor temperature signal 44 is high, and when the motor temperature is above the designated threshold, the motor temperature signal 44 is low. When the battery voltage is above the designated threshold, the battery voltage signal 46 is high, and when the battery voltage is below the designated threshold, the battery voltage signal 46 is low.

When the reverse enable switch 60 is pressed, the reverse enable signal 68 is high, and when the reverse enable switch 60 is not pressed, the reverse enable signal 68 is low. A D-latch provides a desired latching function. When the go reverse switch 62 is pressed, the go reverse signal 70 is high, and when the go reverse switch 62 is not pressed, the go reverse signal 70 is low.

The timer 50 provides the timer signal 52 that defaults to high. Upon pressing the go reverse switch 62 and activating the motor, the timer 50 starts counting. After twenty-five seconds, the timer signal 52 changes to low, thus disabling the system.

As can be seen in the logic diagram of FIG. 5, in order to activate the reverse drive motor 30, several things must occur. The vehicle transmission 22 must be in neutral, the engine 30 must be running, the motor temperature must be below the designated threshold, the battery voltage must be above the designated threshold, and the user must move the reverse enable switch 60 to the on position. At this point, if all of the above-noted parameters are correct, the reverse enable light 74 will go on to provide a visual indication to the user that the reverse drive motor 30 is ready to be activated. The user can then press the go reverse switch 62, which will result in activation of the reverse drive motor 30. If the reverse drive motor 30 is operated for more than four seconds, the reverse drive control 34 will stop the motor 30 and disable the system.

Various features and advantages are set forth in the following claims.

The invention claimed is:
1. A vehicle comprising:
a chassis having a front defining a forward direction and a rear defining a rearward direction;
a rotatable wheel supporting the chassis;
a forward drive mechanism including an internal combustion engine that has a crank shaft that rotates when the engine is running; and
a reverse drive mechanism including:
a reverse drive motor adapted to move the chassis in the rearward direction; and
a reverse drive control programmed to inhibit operation of the reverse drive mechanism unless the internal combustion engine is running.
2. A vehicle as claimed in claim 1, wherein the rotatable wheel comprises three rotatable wheels.

3. A vehicle as claimed in claim 1, wherein the reverse drive motor is an electric motor.

4. A vehicle as claimed in claim 3, further comprising a battery for operating the electric motor, wherein the reverse drive control is programmed to inhibit operation of the reverse drive motor when a characteristic of the battery falls below a threshold.

5. A vehicle as claimed in claim 4, wherein the characteristic is a voltage of the battery.

6. A vehicle as claimed in claim 1, wherein the forward drive mechanism includes a transmission having a neutral position, and wherein the reverse drive control is programmed to inhibit operation of the reverse drive motor when the transmission is not in the neutral position.

7. A vehicle as claimed in claim 1, further comprising a temperature sensor that senses a temperature of the reverse drive motor, and wherein the reverse drive control is programmed to inhibit operation of the reverse drive motor when the temperature of the reverse drive motor exceeds a threshold.

8. A reverse drive mechanism adapted to be used on a vehicle having a chassis and an internal combustion engine that has a crank shaft that rotates when the internal combustion engine is running, the reverse drive mechanism including:

a reverse drive motor adapted to move the chassis in a rearward direction; and a reverse drive control including a status input for receiving a signal indicative of the condition of the internal combustion engine, and programmed to inhibit operation of the reverse drive mechanism unless the internal combustion engine is running.

9. A mechanism as claimed in claim 8, wherein the reverse drive motor is an electric motor.

10. A mechanism as claimed in claim 9, further comprising a battery for operating the electric motor, and wherein the reverse drive control is programmed to inhibit operation of the reverse drive motor when a characteristic of the battery falls below a threshold.

11. A mechanism as claimed in claim 10, wherein the characteristic is a voltage of the battery.

12. A mechanism as claimed in claim 8, wherein the vehicle further includes a transmission having a neutral position, the reverse drive control further including a neutral status input, and wherein the reverse drive control is programmed to inhibit operation of the reverse drive motor when the transmission is not in the neutral position.

13. A mechanism as claimed in claim 8, further comprising a temperature sensor that senses a temperature of the reverse drive motor, and wherein the reverse drive control is programmed to inhibit operation of the reverse drive motor when the temperature of the reverse drive motor exceeds a threshold.

* * * * *